Sept. 3, 1935.   W. N. DAVIS ET AL   2,013,203
PROCESS OF MANUFACTURING MERCAPTANS
Filed April 11, 1932
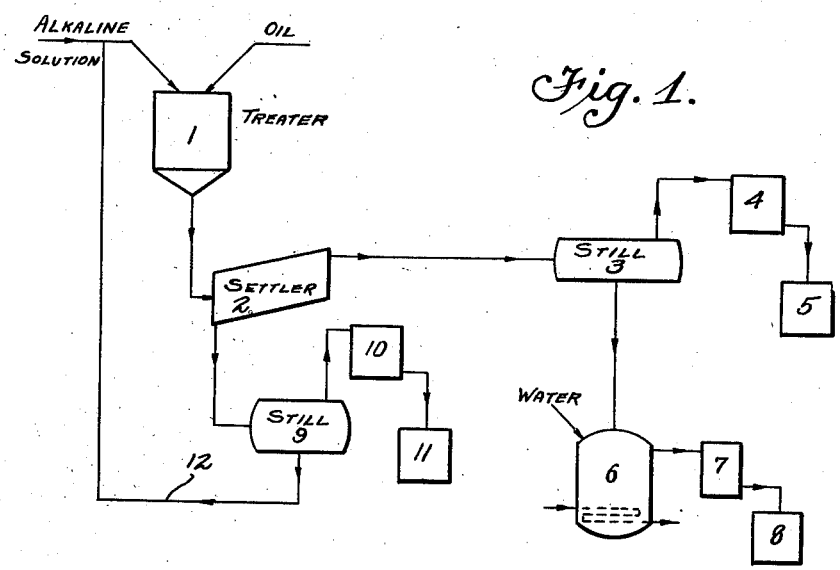
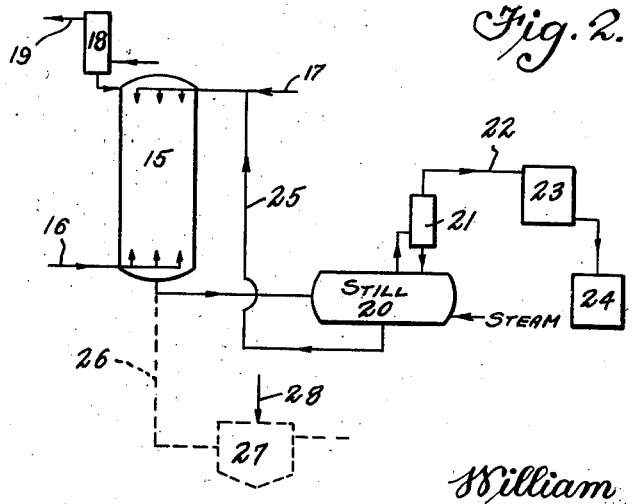

Patented Sept. 3, 1935

2,013,203

UNITED STATES PATENT OFFICE 2,013,203

PROCESS OF MANUFACTURING MERCAPTANS

William N. Davis and Melvin M. Holm, Berkeley, Calif., assignors to Standard Oil Company of California, San Francisco, Calif., a corporation of Delaware Application April 11, 1932, Serial No. 604,540

2 Claims. (Cl. 260—156)

This invention relates to a process of treating hydrocarbon vapors or light petroleum distillates, for the purpose of producing mercaptans and mercaptides therefrom.

An object of this invention is to disclose and provide a method of preparing mercaptans from petroleum vapors or distillates in a ready and economical manner.

Another object is to disclose and provide a method of treating petroleum vapors or distillates whereby said petroleum vapors or distillates are purified and simultaneously mercaptides and mercaptans are produced as a product.

A still further object of this invention is to disclose a particular sequence of steps and conditions by means of which mercaptans may be readily produced from petroleum vapors or distillates.

Mercaptans are organic chemical compounds similar in type to alcohols but containing sulfur in place of oxygen. They are also known as thioalcohols or thiols. Mercaptans may be either aliphatic or aromatic, ethyl mercaptan, $C_2H_5.SH$, being a typical aliphatic thiol.

Although as stated hereinabove, the primary object of this invention is to disclose a process of obtaining mercaptans and mercaptides in suitable form for use as crude chemical reagents, odorants, etc., the process of this invention is also applicable to the purification of petroleum distillates and petroleum vapors containing mercaptans. The products produced in accordance with this invention, namely, the various mercaptans, have a number of various uses. Ethyl mercaptan, for example, is used in the production of products such as sulfonal, trional and tetronal. Other mercaptans, or mixtures thereof, may be used as odorants or signalling substances in fuel and illuminating gas.

Briefly stated, the process of this invention comprises contacting a petroleum vapor or distillate with an alkaline solution at atmospheric or superatmospheric temperature, and then converting to mercaptans the mercaptides produced by such contact. The mercaptans may either be removed and separated by distillation and condensation or by acidifying the mercaptide solution so as to liberate the mercaptans as a water-immiscible oil.

The process in its several modifications will be described in detail hereafter, reference being had to the appended diagrammatic drawing, in which:

Fig. 1 diagrammatically illustrates the steps preferably used in producing mercaptans by a liquid phase process.

Fig. 2 diagrammatically illustrates the steps employed in producing mercaptans in a vapor phase process.

As stated hereinabove, the initial step of the process comprises contacting a petroleum distillate or vapor containing mercaptans, with an alkaline solution. A solution of caustic soda or a sodium plumbite solution may be used. Although the reaction between mercaptans and caustic or plumbite solutions takes place at all concentrations of such solutions, it is desirable that the caustic solution be above 8° Bé. and preferably between about 14° Bé. and 16° Bé. for commercial operations. No advantage is attained by employing caustic soda solutions above about 20° Bé. Sodium plumbite solutions made up of 14°-16° Bé. caustic soda solution initially saturated with lead oxide, are well adapted for the purposes of this invention.

As shown in Fig. 1, a petroleum oil or distillate containing mercaptans (such as cracked naphtha), may be supplied to a mixing chamber 1 and mixed therein with a sodium plumbite or doctor solution. From about 1/40 to 3/10 parts by volume of doctor solution may be required, this proportion varying with the mercaptan content of the petroleum distillate being treated. The mixing in the chamber 1 may take place either at atmospheric or superatmospheric temperature. Obviously, if superatmospheric temperatures are employed, the mixing device may be provided with a jacket or coils, and preferably is enclosed so as to prevent the escape of vapors.

The mixture of doctor solution and naphtha may then be sent to a settling chamber 2. It will be found that upon stratification, the naphtha will contain the higher lead mercaptides, these being oil soluble. When a naphtha relatively high in mercaptans is treated, the lead mercaptides are precipitated and will exist as solids in the interphase between the oil and the aqueous doctor solution. At lower concentrations and at higher temperatures the mercaptides would be soluble in the aqueous solution. The naphtha, together with its contained higher lead mercaptides, may be removed by decantation and sent to a still 3 wherein separation between the lead mercaptides and the naphtha is accomplished by vaporizing the naphtha, the naphtha vapors passing into a condenser 4 and being collected in a tank 5. A residue of higher lead mercaptides is thus obtained; these higher lead mercaptides may then be hydrolyzed in the presence of water, either in the same still 3 or, as shown in Fig. 1, in a separate distillation unit 6. The distillation of the mercaptides with steam decomposes the mercaptides to mercaptans which pass off as a vapor and may be condensed as by condenser 7 and collected in a suitable receptacle 8. Such digestion or distillation can be carried out at any desired temperature and pressure, but temperatures of from about 150° F. to 300° F. and pressures up to 100 pounds have been successfully employed.

The sodium plumbite solution together with its lower mercaptides remaining in the settling tank 2 may be sent to a still 9 and there distilled, the mercaptides being hydrolyzed so as to form mercaptans which pass off as a vapor and are condensed by suitable condensing means 10 and then collected in a tank 11. The residual sodium plumbite solution may be recirculated as by line 12 for reuse in the treatment of further batches of naphtha.

In a process of the character described hereinabove, mercaptans of the entire naphtha boiling point range are obtained. If it is merely desired to obtain lower boiling mercaptans, then relatively low boiling point hydrocarbon distillates should be treated. The higher boiling mercaptans occur in the higher boiling distillates.

As an illustrative example of the process, a crude cracked distillate produced in the cracking of a California gas oil and containing 0.138 mercaptan sulfur, was treated at room temperature with $\frac{1}{10}$ its volume of 10% caustic soda solution. About 60% of the mercaptans contained in the distillate were removed as sodium mercaptides. The distillate was separated from the aqueous alkaline solution and the aqueous solution then boiled to hydrolyze the mercaptides. In the arrangement of apparatus used, the condensate obtained by the distillation of the caustic soda solution separated into two layers, the upper consisting of substantially pure mercaptans and the lower of water. The water was cycled back to the still in order to maintain the concentration of the sodium hydroxide in the boiling liquid substantially constant.

The petroleum distillate separated from the caustic soda solution and its mercaptides, contained substantially no sulfur.

Since the lower molecular weight mercaptans are somewhat soluble in water, it might be desirable to increase the recovery by extracting such dissolved mercaptans from the watery condensate by means of an organic solvent such as, for example, a purified petroleum distillate having a boiling point range somewhat different from that of the mercaptans extracted. The petroleum distillate extract may then be redistilled so as to produce substantially pure mercaptans.

It is to be noted that in a process of the character described hereinabove, when the petroleum distillate has been treated with a doctor solution so that lead mercaptides are present in the petroleum distillate, such petroleum distillate should be separated from the doctor solution and vaporized, as in the still 3, in the substantial absence of water, so as to prevent the hydrolysis of the mercaptides during the distillation of the naphtha.

Fig. 2 illustrates what we term a vapor phase modification of our process. The hydrocarbon vapors may be admitted into a tower 15 as by line 16. A caustic soda or doctor solution supplied by line 17, passes downwardly through the tower and in counter-current relationship to the vapors. The tower is preferably filled with Raschig rings or other means for extending the contact area.

The hydrocarbon vapors, after being contacted with the alkaline solution, may pass through trap 18 adapted to remove water or alkaline solution therefrom and return it to the tower 15. The purified hydrocarbon vapors are discharged by line 19. The alkaline solution, together with its mercaptides, may be sent to a digester or still 20 wherein it is boiled and the mercaptides converted into mercaptans. The vapors may pass through a reflux condenser 21, the aqueous vapors being returned to the still 20. The mercaptans may pass by line 22 through a condenser 23 and be discharged into a tank 24. The caustic solution from which the mercaptides and mercaptans have been removed, may be returned as by line 25 for use in contacting with additional quantities of hydrocarbon vapors.

A modification applicable to either the liquid phase or vapor phase process comprises the acidification of the spent caustic soda solution or sodium plumbite solution and the recovery of mercaptans therefrom as a water-immiscible oil. For example, the caustic soda or sodium plumbite solution, together with its mercaptides, may be diverted as by line 26 into a vessel 27 and a suitable quantity of mineral acid added thereto as by line 28. Any acid may be employed although sulfuric and hydrochloric acids may be ordinarily used. The amount of acid added should be sufficient to neutralize the solution. After agitating the mixture, the acidified solution is permitted to stand, whereupon the mercaptans will separate in the form of an oily layer which can be removed by decantation.

In the vapor phase process described hereinabove, the temperatures at which the hydrocarbon vapors are contacted with an alkaline solution may range from atmospheric to temperatures of about 250° F. The higher temperatures are permissible when pressure is employed. The temperatures should be sufficiently high so as to prevent the petroleum vapors from condensing and should be sufficiently low to prevent the vapor pressure of mercaptans from interfering with their removal.

Illustrative of a vapor phase process, the following may be cited:

A gaseous mixture consisting essentially of butane and butenes having a boiling point range of between 20° F. and 45° F. and containing 0.39% by weight of sulfur, principally as methyl mercaptans, was scrubbed at atmospheric temperature with a sodium plumbite solution made up of 14° Bé. caustic soda solution initially saturated with lead oxide. The doctor solution was used at the rate of 1 gallon to 45 pounds of the hydrocarbon gas. The sulfur content of the gas was reduced from 0.39% to 0.012%.

After removal from the treating tower, the spent doctor solution, together with its mercaptides, was boiled and the lead mercaptides decomposed with the vaporization of mercaptans. Of the total sulfur bodies present in the spent doctor solution, 81% were recovered from the condensate in the boiling operation as mercaptans. This condensate was a liquid boiling between about 43° F. and 46° F. and consisted of practically pure methyl mercaptan.

The effect of increasing the treating temperature in the scrubbing tower may be appreciated from the fact that a similar butane-butene gas when scrubbed with a similar doctor solution at 180° F. had its sulfur content reduced only from 0.44% to .05% by weight.

The following is another example of the process:

A crude cracked naphtha fraction boiling between 80° F. and 195° F., containing 0.46% total sulfur of which 0.193% was present as mercaptan sulfur, was vaporized and the vapors contacted at 205° F. with 16° Bé. caustic soda solution saturated with lead oxide. After this contacting operation, the total sulfur of the naphtha fraction was reduced to 0.29% and the mercaptan sulfur was reduced to 0.034%. The spent doctor solution resulting from this contacting step contained 1.11% sulfur. This doctor solution was distilled with steam and the mercaptides decomposed to mercaptans volatile at the boiling temperature. 64% of the sulfur contained in the doctor solution was recovered in the condensate distilled during boiling as mercaptans, these mercaptans having a boiling point range of between 95° F. and 194° F.

It will be evident to those skilled in the art that a simple and effective method of producing mercaptans has been provided, the process not only producing mercaptans in a concentrated and purified form, but in addition producing hydrocarbon fractions or vapors which are substantially sulfur-free and which therefore are much more amenable to further petroleum refining operations. As a matter of fact, the remaining hydrocarbon vapors or liquids may be used without subsequent treatment for purposes to which such hydrocarbon vapors or liquids are normally adapted. If it is desired to further subject the hydrocarbons to refining, the removal of the mercaptans permits a material reduction in the amount of reagents ordinarily employed for such subsequent treatment.

The mercaptide-containing solution or the mercaptan-containing solution obtained after either hydrolyzing or acidifying the mercaptides, may be utilized directly for certain purposes. For example, when it is desired to impart a signal odor to fuel gas, such gas may be scrubbed with a heated mercaptide- or mercaptan-containing solution, the mercaptans being thus liberated directly into the gas.

Although as described hereinabove, the process in general comprises contacting the vapor or distillate with a caustic soda solution or sodium plumbite solution at or above atmospheric temperature, followed either by a hydrolyzing operation accomplished by boiling the alkaline solution or distilling it with steam, or by acidifying the alkaline solution, numerous changes and modifications can be made in the process without departing from the spirit of the invention.

For example, when a sodium plumbite solution is used, the precipitated lead mercaptides may be settled or otherwise removed from the solution and then treated separately for the recovery of mercaptans. Either the acid treating modification of the process, described hereinabove, or the use of steam, may be used in the treatment of such lead mercaptides.

Although certain specific temperatures, conditions, concentrations and quantities have been specifically set forth, it is to be understood that such temperatures, conditions, concentrations, etc., are merely illustrative and those skilled in the art will appreciate that numerous changes and modifications can be made.

All such changes and modifications as come within the scope of the appended claims are embraced thereby.

We claim:

1. In a process of producing mercaptans from petroleum hydrocarbons, the steps of contacting vapors of hydrocarbons containing mercaptans with a sodium plumbite solution to form lead mercaptides, separating the hydrocarbon vapors from the plumbite solution and mercaptides contained therein, then hydrolyzing the lead mercaptides with steam to convert the mercaptides into mercaptans, vaporizing the mercaptans, separately condensing said mercaptans, and recirculating the residual plumbite solution into contact with further quantities of hydrocarbon vapors in cyclic operation of the process.

2. In a process of producing mercaptans from petroleum hydrocarbons, the steps of contacting hydrocarbons containing mercaptans with a sodium plumbite solution, separating the hydrocarbons from the plumbite solution and lead mercaptides dissolved and suspended therein, hydrolyzing the lead mercaptides contained in the plumbite solution, vaporizing the produced mercaptans, and separately condensing said mercaptans.

WILLIAM N. DAVIS.
MELVIN M. HOLM.